(12) United States Patent
Fernandez et al.

(10) Patent No.: US 7,882,486 B2
(45) Date of Patent: Feb. 1, 2011

(54) ADDING INTERACTIVITY TO ARTWORK

(75) Inventors: Roland L. Fernandez, Woodinville, WA (US); Bradford Gillespie, Seattle, WA (US); Wistar D. Rinearson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1393 days.

(21) Appl. No.: 11/352,163

(22) Filed: Feb. 10, 2006

(65) Prior Publication Data

US 2007/0192745 A1 Aug. 16, 2007

(51) Int. Cl.
*G06F 9/44* (2006.01)

(52) U.S. Cl. .................. 717/105; 717/107; 717/109; 717/110; 717/113; 717/117; 706/11; 707/805; 715/700

(58) Field of Classification Search ............ 717/105, 717/109, 113, 117
See application file for complete search history.

(56) References Cited

U.S. PATENT DOCUMENTS

| | | | | |
|---|---|---|---|---|
| 4,896,291 A * | 1/1990 | Gest et al. | ............ | 715/841 |
| 5,327,529 A * | 7/1994 | Fults et al. | ............ | 715/762 |
| 5,602,981 A * | 2/1997 | Hargrove | ............ | 715/840 |
| 5,680,619 A * | 10/1997 | Gudmundson et al. | ...... | 717/108 |
| 5,687,317 A * | 11/1997 | Hughes et al. | ............ | 709/205 |
| 5,745,113 A * | 4/1998 | Jordan et al. | ............ | 715/835 |
| 5,867,175 A * | 2/1999 | Katzenberger et al. | ...... | 345/473 |
| 5,870,088 A * | 2/1999 | Washington et al. | ........ | 715/781 |
| 5,907,704 A * | 5/1999 | Gudmundson et al. | ...... | 717/100 |
| 5,999,178 A * | 12/1999 | Hwang et al. | ............ | 715/787 |
| 6,601,233 B1 * | 7/2003 | Underwood | ............ | 717/102 |
| 7,069,542 B2 * | 6/2006 | Daly | ............ | 717/126 |
| 7,139,999 B2 * | 11/2006 | Bowman-Amuah | ........ | 717/101 |
| 7,205,978 B2 * | 4/2007 | Poupyrev et al. | ............ | 345/157 |
| 7,334,216 B2 * | 2/2008 | Molina-Moreno et al. | .. | 717/109 |
| 7,386,835 B1 * | 6/2008 | Desai et al. | ............ | 717/117 |
| 7,552,383 B2 * | 6/2009 | Morris et al. | ............ | 715/230 |
| 2001/0052108 A1 * | 12/2001 | Bowman-Amuah | ........ | 717/1 |
| 2002/0184610 A1 * | 12/2002 | Chong et al. | ............ | 717/109 |
| 2003/0115572 A1 * | 6/2003 | Zondervan et al. | ........ | 717/109 |
| 2004/0153992 A1 * | 8/2004 | Molina-Moreno et al. | .. | 717/105 |

(Continued)

OTHER PUBLICATIONS

Title: a framework of a Web-based distributed control system, author: Chen et al, source:IEEE, dated: May 4, 2003.*

Title: Interactive Graphics for Web Based Application: author: Michael Sweeney, source: IEEE, dated: Jun. 19, 2000.*

* cited by examiner

*Primary Examiner*—Chameli C Das
(74) *Attorney, Agent, or Firm*—L. Alan Collins; Collins & Collins Incorporated (57) ABSTRACT

A prototyping tool is provided to an artistic team, which can use the tool to experiment with, demonstrate, and communicate aspects of the user interface interaction with various user interface elements. These user interface elements can be defined within a layered graphics representation of the user interface artwork, rather than individual flattened graphics files. By setting properties on individual user interface elements through the prototyping tool, the artistic team can review how the elements will appear and behave during typical interaction with a user. Furthermore, a description of the interaction properties and relationships of these user interface elements, as defined by the artistic team, is captured for communication to a programming team. The programming team can then load the layered graphical representation and the interaction description to implement the user interface interactivity developed and proposed by the artistic team.

19 Claims, 7 Drawing Sheets

U.S. PATENT DOCUMENTS

| | | | |
|---|---|---|---|
| 2005/0071350 A1* | 3/2005 | Artale et al. | 707/100 |
| 2006/0059461 A1* | 3/2006 | Baker et al. | 717/113 |
| 2006/0212841 A1* | 9/2006 | Sinai et al. | 717/105 |
| 2008/0209391 A1* | 8/2008 | Iborra et al. | 717/105 |
| 2008/0275910 A1* | 11/2008 | Molina-Moreno et al. | 707/103 R |

Fig. 6

ADDING INTERACTIVITY TO ARTWORK

BACKGROUND

User interface development in modern software applications typically involves interaction between an artistic team responsible for the look and feel of the user interface (e.g., such as graphics designers, usability engineers, and program managers) and a programming team responsible for implementing the user interface (e.g., software developers). In a traditional approach, an artistic team may define artwork using a layered graphical design tool and then output flattened graphical definitions of individual user interface elements for use by the programming team. For example, having defined a layered representation of an assortment of user interface artwork, the artistic team may then define an "up-button" graphic in a flattened format in a graphics file (e.g., a GIF file) and a "down-button" graphic in a flattened format in a separate graphics file. The programming team can then use presentation scripting or high level programming code to load and add user interface functionality (e.g., user interactivity) to the individual user interface elements as part of the software application.

However, this development environment introduces a gap between the artistic team and the programming team. The artistic team does not generally possess the scripting or programming skills needed to prototype user interactivity with the user interface elements during the initial design phase. As such, the artistic team has to wait for the programming team to integrate the artwork before they can evaluate the artwork under interactive conditions. Based on this evaluation, the artistic team can then revise the set of individual graphics files and provide this new set to the programming team, which updates the scripting and/or programming to accommodate the new graphics files. This back-and-forth interaction proceeds, inefficiently, until both the artistic team and the programming team are satisfied with the user interface.

SUMMARY

Implementations described and claimed herein address the foregoing problems by providing the artistic team with a prototyping tool with which it can experiment, demonstrate, and communicate aspects of the user interface interaction with various user interface elements. These user interface elements can be defined within a layered graphics representation of the user interface artwork, rather than individual flattened graphics files. By setting properties on individual user interface elements through the prototyping tool, the artistic team can review how the elements will appear and behave during typical interaction with a user. Furthermore, a description of the interaction properties and relationships of these user interface elements, as defined by the artistic team, is captured (e.g., in an algorithmic or rule-based description) for communication to a programming team. The programming team can then load the layered graphical representation and the interaction description to implement the user interface interactivity developed and proposed by the artistic team.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Figure 1:
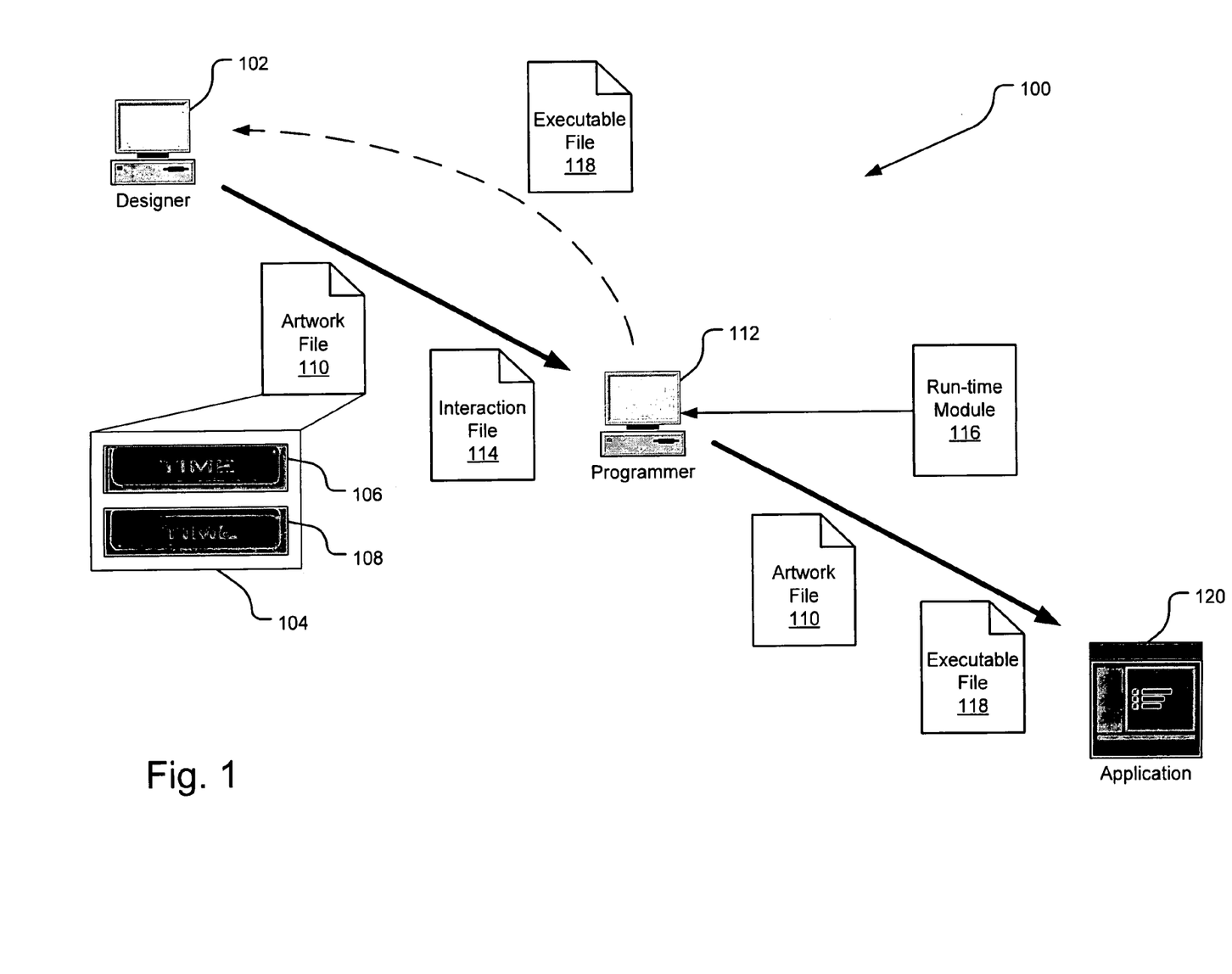
FIG. 1 illustrates data flow in an example software application development process.

FIG. 1 illustrates data flow in an example software application development process 100. A member of an artistic team, such as a graphics designer, designs artwork for a software application 120. Example artwork may include the graphical features of a button, window, control, or other user interface element, including window content, graphics and text. The artwork can be stored in a layered graphical representation, such as an ADOBE PHOTOSHOP file, which is generally attributed with the .psd suffix in the MICROSOFT WINDOWS environment. A layered graphical representation can store individual components of one or more user interface elements in separate "layers", which are arranged in a stacked order from back to front. Individual layers can be shown or hidden to yield a specific representation of a user interface element.

For example, a layered graphical representation may include a background layer, layers associated with various representations of a button, and layers associated with graphical and/or textual display regions. By showing specific layers associated with the button and hiding all other layers, a specific button state can be displayed. To help illustrate different representations of a user interface element, the sample 104 is shown to include two specific representations 106 and 108 of a button, as taken from a layered graphical representation, shown in artwork file 110. By showing and hiding select layers in the artwork file 110, the standard button 106 is provided. In contrast, by showing and hiding different layers in the artwork file 110, the depressed button 108 is provided. In this manner, a layered graphical representation allows the designer 102 to easily create and edit individual buttons, text, shapes, and other user interface elements for use by the programming team in developing the software application 120. In FIG. 1, the layered graphical representation is communicated as the artwork file 110 to the programmer 112.

In one implementation, layer naming conventions used within the layered graphical representation may be employed to communicate layer semantics to the programmer. An example naming convention for button elements may be used as follows, where "Foo" represents the name of the button followed by the naming-convention-defined suffix:

| | |
|---|---|
| foo-up | the standard or default image for a button Foo |
| foo-down | the "mouse down" image for a button Foo |
| foo-over | the "mouse over" image for a button Foo |
| foo-downsel | the "mouse down and selected" image for a button Foo |
| foo-test | the mouse "hit test" area for a button |
| foo-25-f0003 | frame #3 for an animation (played for 25 ms) |

It should be understood that other naming conventions may also be employed. Using such naming conventions, the designer's intended functionality for the button image (e.g., foo-up) is communicated to the programmer 112 via the layered graphical representation based on the name of the layer that embodies the image.

While naming conventions can provide some interaction description for user interface elements, a richer interaction description may be additionally or alternatively provided through an interaction file 114. As the graphical designer 102 designs images for the layered graphical representation, he or she can load the layered graphical representation into a prototyping tool that can attribute interactivity to the various user interface elements represented by the images. Using such a prototyping tool, the designer can set interaction properties, such as states, events, and behavior actions, that can be interpreted and executed within the prototyping tool to allow the designer to test the proposed interactivity. Furthermore, the interaction properties can be captured in the interaction file 114, which is communicated to the programmer 112.

Using the interaction file 114 and the layered graphical representation, the programmer 112 can implement the interactivity proposed by the designer 102 in the interaction file 114. In one implementation, the programmer 112 writes code to load the artwork file 110 and the interaction file 114 using a run-time module 116 associated with the prototyping tool. The application program interface (API) of the run-time module 116 provides support for loading the artwork file 110, reading the interaction file 114, manipulating the defined layers and states, hooking environment events, and executing environment actions. This support allows the programmer to accept, override, and supplement the defined states and the rules for each state, using his or her native programming language. The programmer can also add new environment actions and events using an add-in dynamic link library (DLL), which can later be returned to the designer so that the designer can have a richer test environment for further design work. Using this approach, the programmer 112 can easily and directly generate an executable file 118 that implements the designer-proposed interactivity, as well as extend that interactivity where needed.

It should also be understood that the executable file 118 can also be returned to the designer 102, who can execute the file 118 in combination with the artwork file 110 to test the interactive functionality implemented by the programmer 112. The designer 102 can alter the artwork file 110, the interaction file 114, and otherwise communicate with the programmer 112 in order to correct any interactivity problems.

Figure 2:
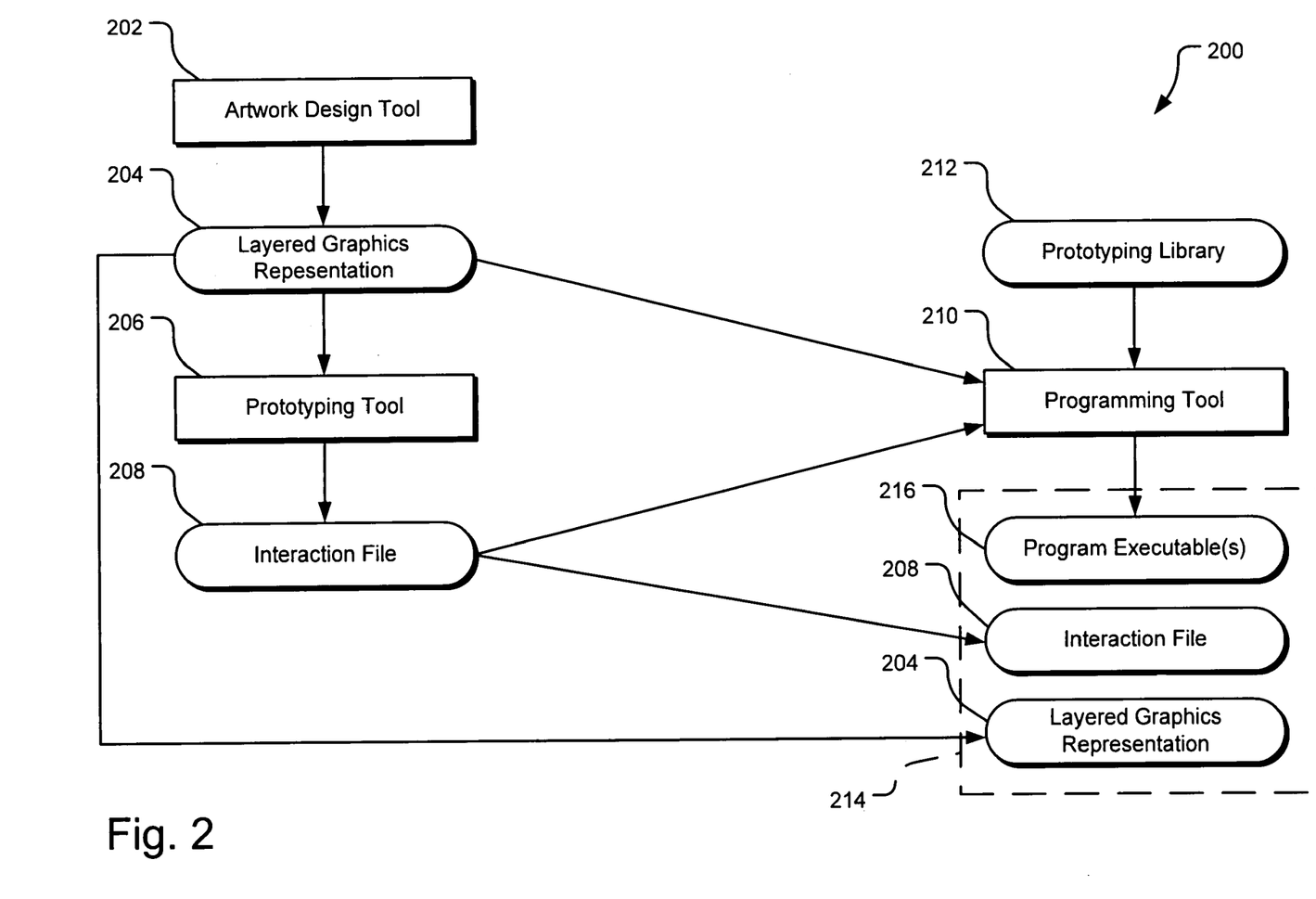
FIG. 2 illustrates elements in an example software application development process.

FIG. 2 illustrates elements in an example software application development process 200. An artwork design tool 202 generates a layered graphical representation 204 (e.g., an artwork file) that contains graphical layers of user interface elements. It should be understood that the graphical layers can be selected to yield different user interface elements or different versions of user interface elements. Example artwork design tools may include without limitation ADOBE PHOTOSHOP, JASC/COREL PAINTSHOP PRO, MACROMEDIA FIREWORKS, and MICROSOFT DIGITAL IMAGE PRO.

In a design phase, a prototyping tool 206 loads the layered graphical representation 204 and presents the available layers to a user, such as a graphics designer. The user can select one or more layers for designation as a state of a user interface. For example, the user may select layers representing two standard buttons and a background as an initial state of a user interface (e.g., see state1 of FIG. 3); the same two standard buttons, the background, and a content screen that shows the current time as a second state (e.g., see state2 of FIG. 3); and the same two standard buttons, the background, and a content that shows the current weather as a third state (e.g., see state3 of FIG. 3).

The user can specify various interaction rules, both global and state-specific, in association with the layered graphical representation. In one implementation, an interaction rule specifies an event and an associated behavior action. For example, a global rule can be set to display a selected state (behavior action) upon initial loading of the layered graphical representation (event). In contrast, a state-specific rule can be set to change from one state to another (behavior action) upon detection of a mouse click on a button in the current state (event). It should also be understood that by virtue of the user naming various user interface layers of the layered graphical representation in accordance with a predefined naming convention, the user interface elements incorporating these layers can exhibit interactivity. For example, if the user specified both of the standard buttons of FIG. 3 using the "-up", "-down", and "-over" suffixes on the names of the associated layers, both buttons exhibit graphical changes in the presence of certain mouse events. Other types of states and interactions rules can also be specified within the prototyping tool.

Interaction rules specified through the prototyping tool 206 can be saved in an interaction file 208. In one implementation, the interaction rules are saved in XML format, although other formats may be employed. The interaction file records the interactivity proposed by the user, typically the designer, for use in a software application.

Within the prototyping tool 206, the user can run a test mode that interprets and executes the interaction file 208 in association with the layered graphical representation 204. The test mode can detect user interface events (such as mouse clicks and mouse movement) and give effect to behavior actions (e.g., switching states, displaying controls, loading files, altering the display, etc.). In the test mode, the user can experiment with various layers, states, events, and behavior actions.

In a programming phase, a user, such as a programmer, develops script instructions or code to load the layered graphical representation 204 and the interaction file 208. In one implementation, the user can employ a prototyping library 212 to assist with the loading of the layered graphical representation 204 and the interaction file 208. The prototyping library 212 can also interpret the interaction file 208 and designate executable code to give effect to the interactivity proposed in the interaction file 208. In addition to implementing the user interface interactivity proposed in the interaction file 208, the user can also supplement or alter this interaction and provide additional functionality for a software application 214, which includes, in one implementation, one or more program executable files 216, the interaction file 208, and the layered graphical representation 204.

Figure 3:
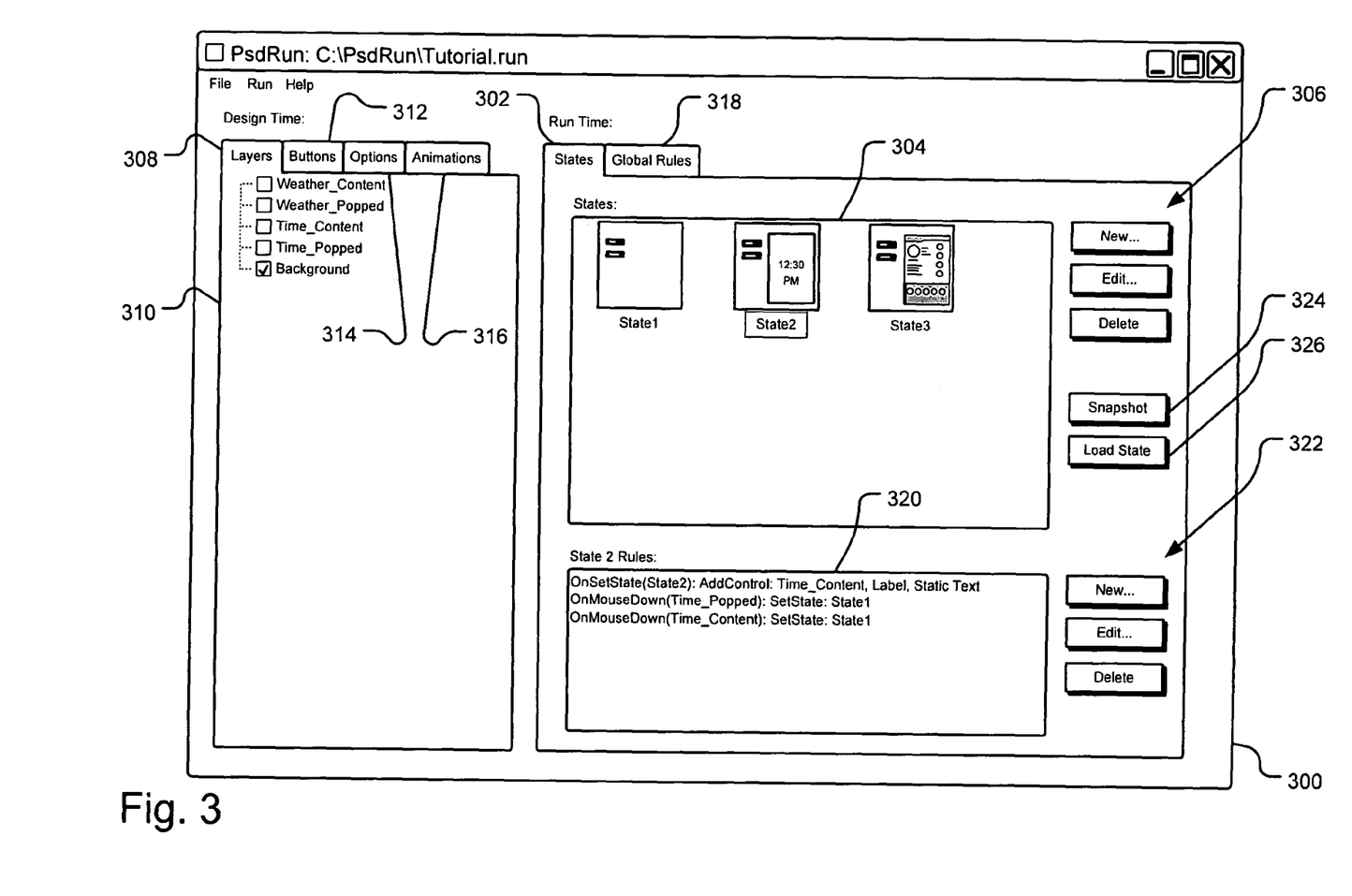
FIG. 3 illustrates a screenshot showing states in an example prototyping tool.

FIG. 3 illustrates a screenshot 300 showing states in an example prototyping tool. A States tab 302 of a "Run Time: States" pane 304 displays states state1, state2, and state3, which represent different user interface states defined by a user of the prototyping tool, as a graphical designer. States can be added, edited or deleted using the "New . . . ", "Edit . . . ", and "Delete" buttons 306. For example, selecting the "New . . . " button displays a dialog box from which the user can specify a state name property and select layers from a layered graphical representation (e.g., setting layer properties associated with the state). Some available layers are listed under the Layers tab 308 in the Design Time pane 310. The layers selected (using the check box) are displayed in a composite user interface display (not shown).

Furthermore, through the dialog box, the user can specify other layers to be included in the user interface state, such as buttons. Some available buttons are listed under the Buttons tab 312 of the Design Time pane 310. An opacity property can also be designated for each layer through the "New . . . " button. The "Edit . . . " button allows alteration of these properties for the selected state. The "Delete" button deletes the selected state. The Options tab 314 provides access to display-related properties of the graphics, such as a Per-pixel Alpha Background property that enables a per-pixel opacity on the background layer for the composite user interface display, and a scaling property that sets the size of the composite user interface display for different display types. An Animation tab 316 provides access to animation-related layer groups, similar to the button tab layer groups.

A Global Rules tab 318 provides access to features that allow a user to set global interaction rules, which are not limited to any specific state. For example, a user may define a global rule that sets the initial state to "State1" (behavior action) upon initial loading of the interaction file and layered graphical representation (event). By setting the rule as a global rule, the behavior action is effected without regard to the current state of the user interface.

Under the States tab 302 of the "Run Time: State x Rules" pane 320, the user can specify state-specific rules. States can be added, edited or deleted using the "New . . . ", "Edit . . . ", and "Delete" buttons 322. In FIG. 3, three state-specific rules are shown with respect to state2:
  (1) OnSetState(State2): AddControl: Time_Content, Label, Static Text—adds a control that displays the current time (behavior action) when the state is set to state2 (event)
  (2) OnMouseDown(Time_Popped): SetState: State1—switches from state2 to state1 (behavior action) when a mouse down event is detected over the Time_Popped layer (event)
  (3) OnMouseDown(Time_Content): SetState: State1—switches from state2 to state1 (behavior action) when a mouse down event is detected over the Time_Content layer (event)

A Snapshot button 324 allows a user to build a user interface (using the Design Time panels) and save the composite user interface as a named state. A Load State button 326 allows a user to load a selected state (from the States tab 302 of a "Run Time: States" pane 304) into the composite user interface display.

A state-specific rule can be defined by selecting the "New . . . " button of buttons 322, which brings up a dialog box (not shown). The dialog box offers a list of possible events, including without limitation:
  mouse events—mouse up, mouse down, mouse enter, and mouse exit
  button events—button click,
  file, layer events—file load, file resize, layer show, layer hide
  state events—set state
  speech events—speech recognized, speech not recognized
  handwriting events—handwriting recognized, handwriting not recognized
  multimedia events—play completed, play stopped, play paused, play resumed
  DLL events—DLL loaded, DLL unloaded
  events defined by add-in DLL's—each add-in DLL add its own set of unique events (e.g., a Telephone add-in DLL might add a "phone ringing" and a "call ended" set of events)

Having selected an event, the user can then select an event parameter, such as the button, state, handwriting/speech pattern recognition, and layer associated with the selected event. The user can also select one or more associated behavior actions to be executed in response to the selected event, including without limitation:
  layer manipulation, such as hide, show, set opacity, etc.
  window manipulation, such as set opacity, set transparency key, etc.
  timing actions, such as delays, etc.
  control creation or modification actions, such as adding a textbox, listbox, etc.
  execution actions, such as executing an external application or OS command, etc.
  handwriting and speech recognition actions, such as setting a grammar, etc.
  sound actions, such as playing a sound, etc.
  speech recognition actions, such as set phrase list, start listening for speech, stop listening for speech, etc.
  speech synthesis actions, such as speaking specified text
  multimedia playback actions, such as playing recorded sound, animation, and video
  file actions, such as loading a new graphics/rules file
  ink manipulation actions, including setting ink on layer, setting color/size, loading/saving a file, playing back an inking action, etc.
  library actions, such as loading/unloading external DLLs
  actions defined by add-in DLL's A set of available behavior actions is discussed with regard to FIGS. 4, and 5.

Figure 4:
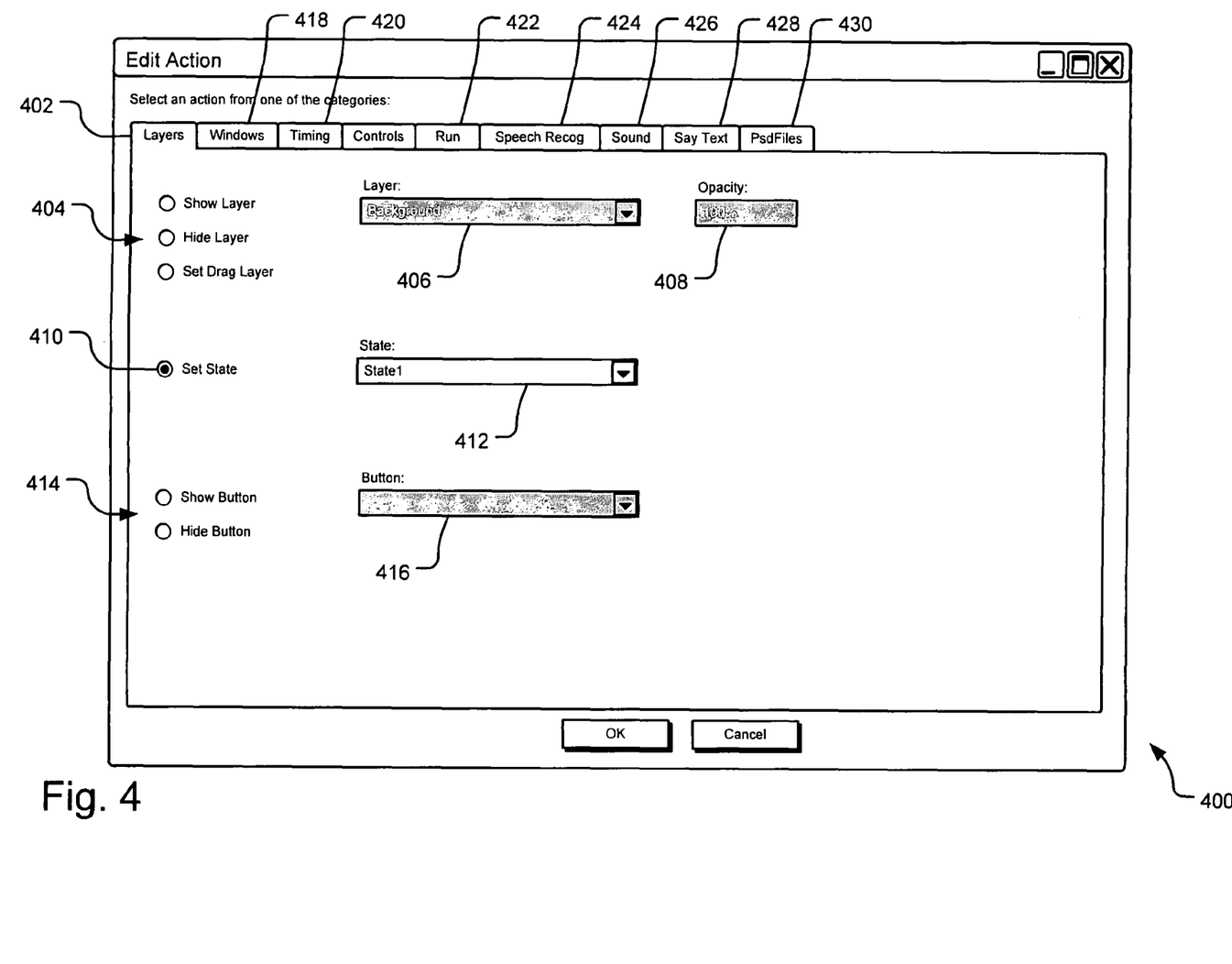
FIG. 4 illustrates a screenshot relating to a layer behavior action in an example prototyping tool.

FIG. 4 illustrates a screenshot 400 relating to a layer behavior action in an example prototyping tool. In section 402, under the Layers tab 404, the user can set a property to define a behavior action that shows a layer, hides a layer, or sets a drag layer (the layer a user can drag to move the containing window), as specified in the Layer form field 406, with the opacity specified in Opacity form field 408. In selection 410, under the Layers tab 404, the user can set a property to set to define a behavior action that sets a new state as the current state, as specified in the State form field 412. In section 414, under the Layers tab 404, the user can set a property to define a behavior action to show or hide a button, as specified in the Button form field 416.

Under the Windows tab 418, the user can set a property to define a behavior action that sets the opacity of the application window that displays the associated user interface state. The user can also set a property to define a behavior action that sets a window transparency key, which defines which color should define the transparent parts of the application window. Under the Timing tab 420, the user can set a property to define a delay behavior action (e.g., to delay further execution by 500 milliseconds). Under the Run tab 422, the user can set a property to define a behavior action that executes a specified command or file with specified command line parameters. Under the Speech Recog tab 424, the user can set a property to define behavior actions that can set a recognizable speech pattern, start listening to speech, or stop listening to speech.

Under the Sound tab 426, the user can set a property to define behavior actions that plays a specified sound or stops playback of a specified sound. Under the Say Text tab 428, the user can set a property to define behavior actions that play a voice reading specified text or stop playback of voice reading specified text. Under the Psd Files tab 430, the user can set a property to define behavior actions that load a new layered graphical representation, unload a layered graphical representation, or close the current layered graphical representation. These actions allow the artwork files and their associated interaction files to be nested and/or chained.

Figure 5:
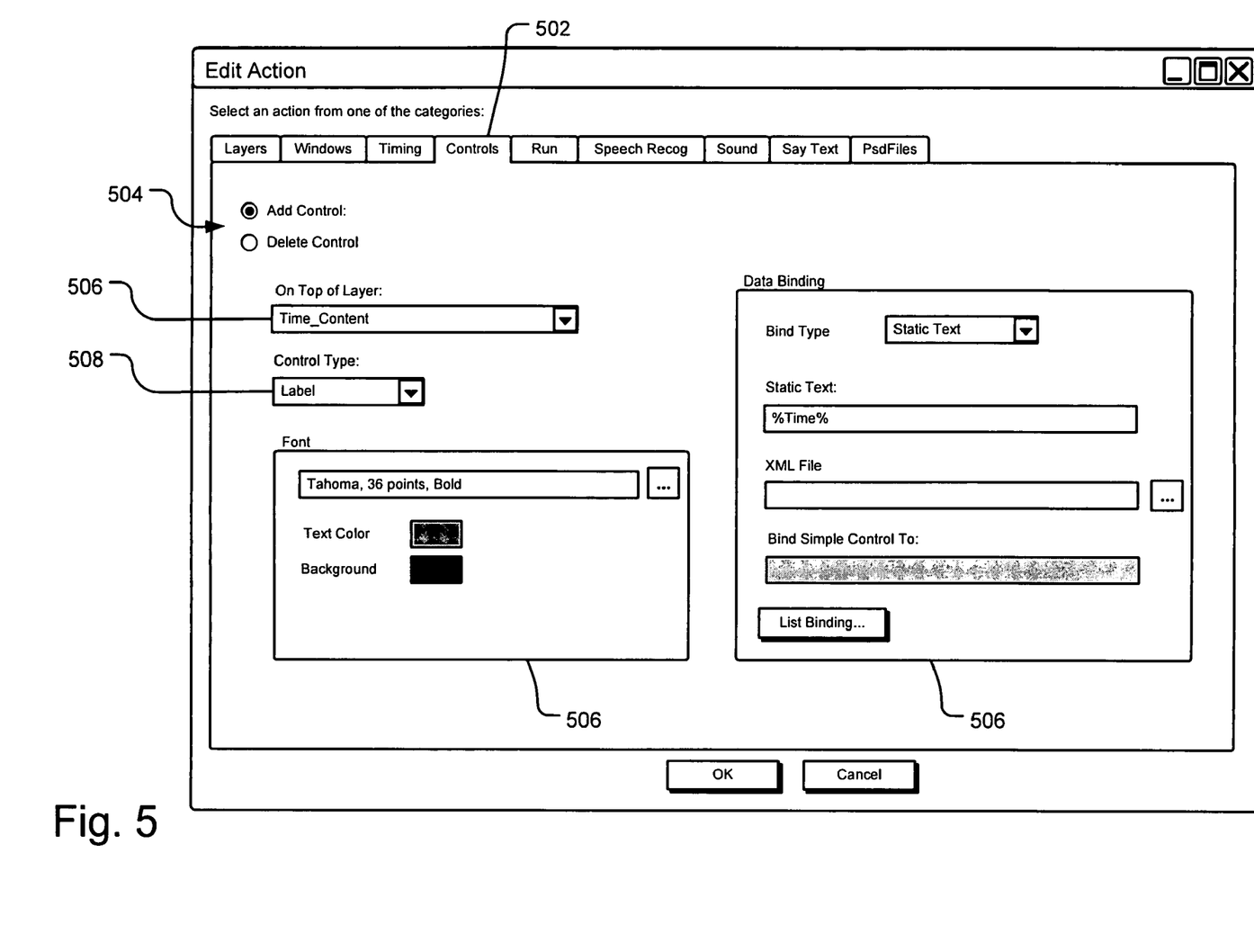
FIG. 5 illustrates a screenshot relating to a control behavior action in an example prototyping tool.

FIG. 5 illustrates a screenshot 500 relating to a control behavior action in an example prototyping tool. Under the Controls tab 502, the user can set a property to define a behavior action that adds or deletes a control in the user interface (see radio buttons 504). Form field 506 sets a property specifying the layer on which the control should be added. Form field 508 sets a property specifying the type of control to be added, such as a Label, Text Box, List View, or Tree View. A Font panel 510 allows the user to set properties specifying the font, font size, font characteristic, text color, and background color associated with the control.

A Data Binding panel 510 allows the user to specifying properties for data binding internal or external data to the control. In the illustrated example, the control is a label, populated with static text taken from a % time % variable defined in the run-time module. Alternatively, the user can specify binding from an external source file, such as an XML file, which can be specified in Data Binding panel 510.

Figure 6:
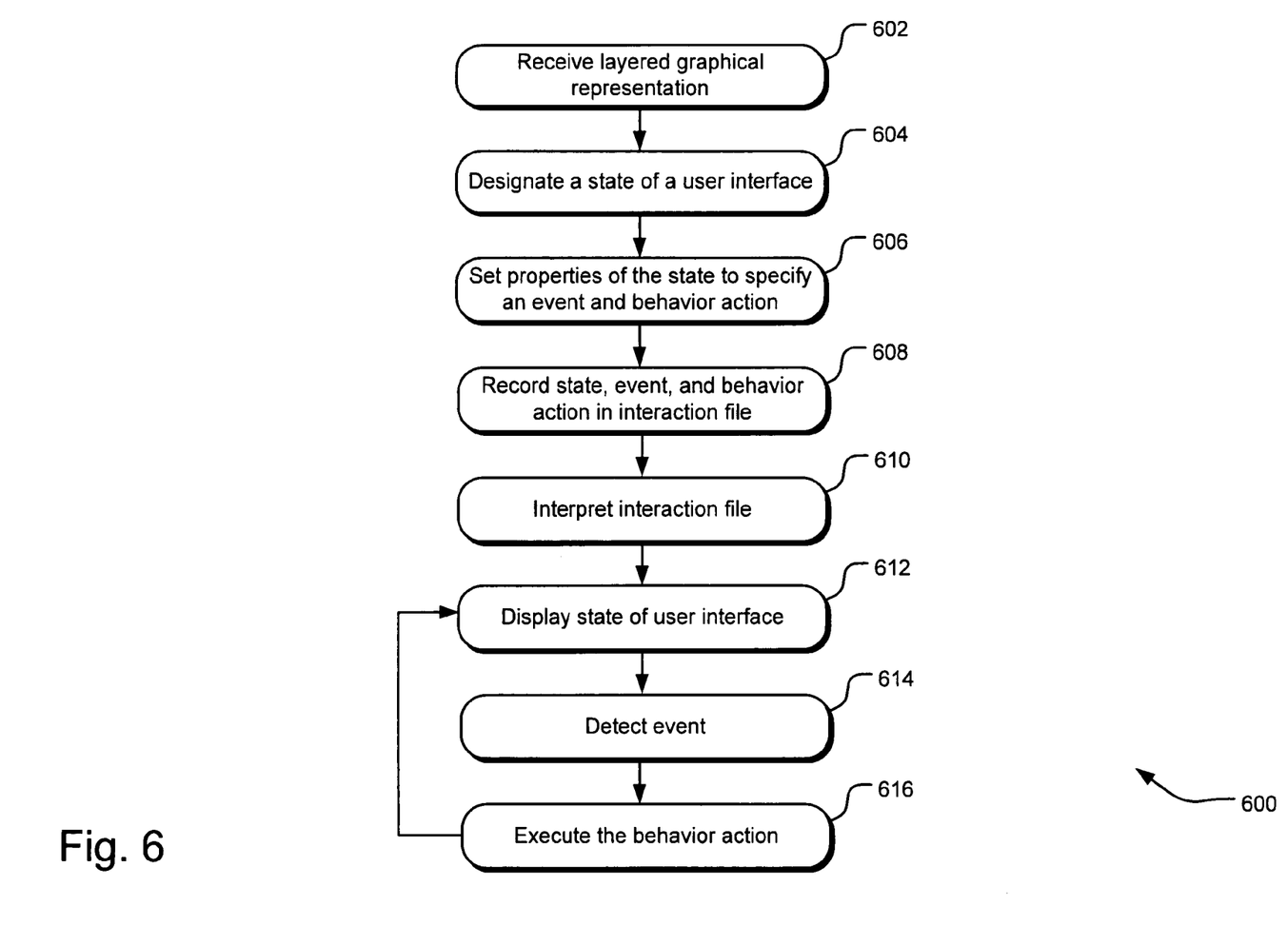
FIG. 6 illustrates example operations of a process for adding interactivity to artwork.

FIG. 6 illustrates example operations 600 of a process for adding interactivity to artwork. A receiving operation 602 receives a layered graphical representation, such as a .psd file. A state operation 604 designates a state of a user interface, such as by selecting one or more layers, buttons, animations, and other display characteristics. An interaction rule operation 606 sets properties to specify one or more events and behavior actions in association with the designated state. A recording operation 608 records the state properties, event properties, and behavior action properties to a persistent datastore, such as a .RUN file in XML format. It should be understood, however, that other types of persistent data storage and formats may be employed. Furthermore, multiple states may be defined by the user in this process and multiple events and behavior actions may be attributed to each state.

An interpreting operation 610 can be executed in a test mode of the prototyping tool or during a programming operation to process the contents of the interaction file. In the test mode, the interpreting operation 610 initiates, in a composite user interface display, execution of the proposed interactivity relative to the defined states of the user interface. During the programming operation, execution of the runtime prototyping library interprets the interactivity specified in the interaction file and implements the proposed interactivity in executable code. During development and design phases of the project in one implementation, the executable program includes 3 main files: the .exe file of compiled program code, the artwork file, and the interaction file. For distribution to end users, all of these files can be combined into an executable .exe file of the software application, thereby simplifying distribution and protecting the artwork file from modification. When building the .exe file for distribution to users, a utility can also generate executable code for the interaction rules, resulting in faster execution and a smaller .exe file During execution, either in test mode or during programming operation, the interaction rules and states are executed. A state operation 612 displays the current state, either in the composite user interface display of the prototyping tool or in the application window of the software application. A detection operation 614 detects on of the events associated with the current state, and a behavior operation 616 execute a behavior action associated with the current state (or the global state) and the detected event. Processing can loop back to the state operation 612, such that interaction continues until terminated by another means.

Figure 7:
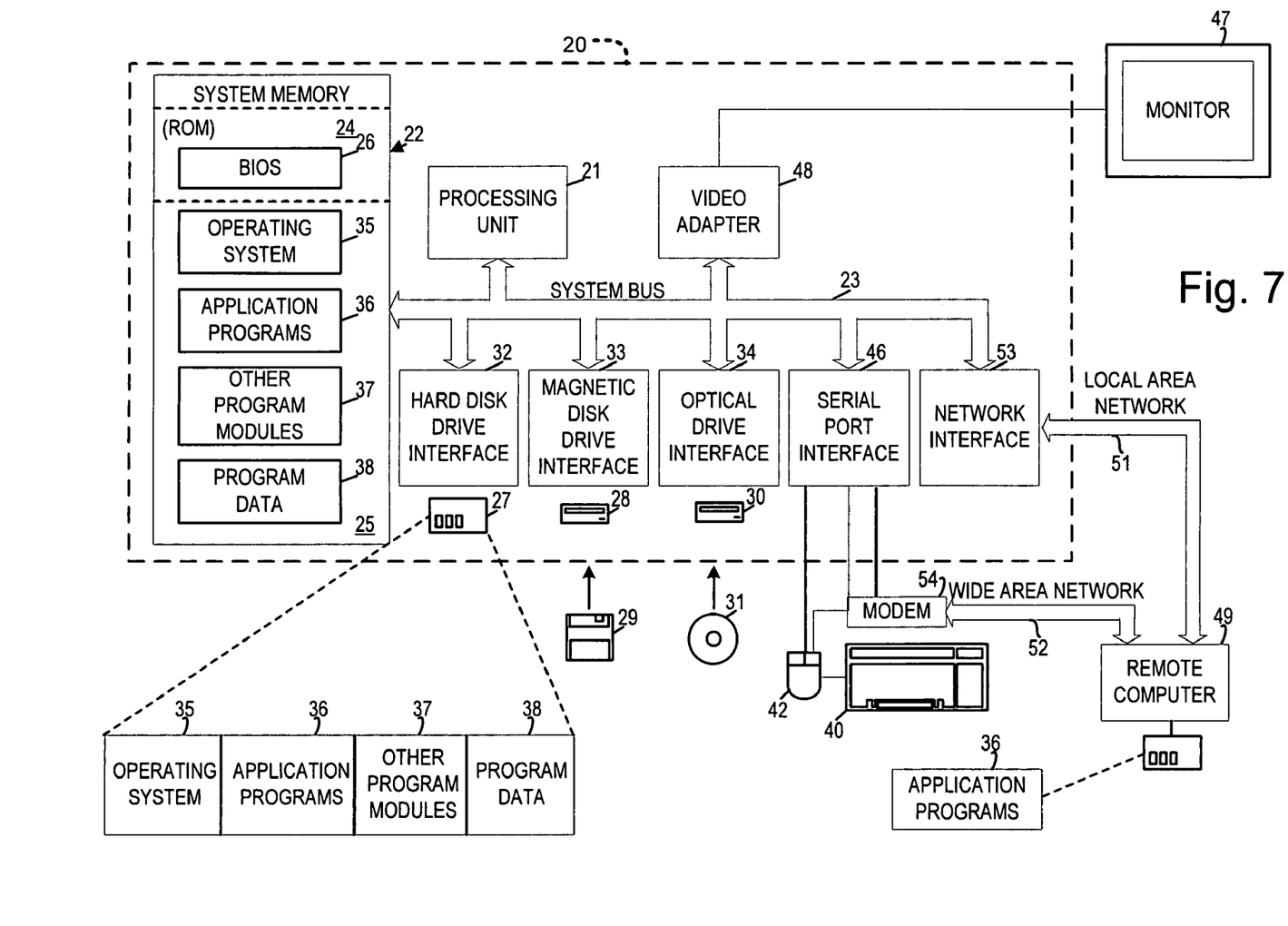
FIG. 7 illustrates an example system that may be useful in implementing the described technology.

The example hardware and operating environment of FIG. 7 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, prototyping tool, a programming tool, a prototyping library, an interpretation module, and other modules may be embodied by instructions stored in memory 22 and/or storage devices 29 or 31 and processed by the processing unit 21. A layered graphical representation, an interaction file, executable code, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method of attributing behavior to at least one user interface element of a plurality of user interface elements of a user interface, wherein the plurality of user interface elements is defined in a layered graphical representation of the user interface, the layered graphical representation specifying a plurality of graphical layers, the method comprising:

designating, based on a selection by a user of at least one of the plurality of graphical layers, the at least one of the plurality of graphical layers as an initial state of the user interface, wherein the at least one of the plurality of graphical layers defines the at least one user interface element;

setting, based on user input, at least one property of the initial state of the user interface, wherein the at least one property specifies at least one event and at least one behavior action of an interaction rule associated with the initial state wherein, in response to the initial state being displayed and at least one of the at least one event being detected, at least one of the at least one behavior action is executed in accordance with the interaction rule associated with the initial state, and wherein the at least one behavior action is configured to display a second state instead of the initial state wherein another at least one of the plurality of graphical layers is designated as the second state;

recording the initial state of the user interface and the at least one property of the initial state of the user interface in a persistent datastore; and wherein the method is performed by a computer.

2. The method of claim 1 wherein at least one of the at least one event indicates user input via the user interface.

3. The method of claim 1 wherein at least one of the at least one event indicates user input via one of the at least one of the user interface element.

4. The method of claim 1 wherein at least one of the at least one behavior action modifies the initial state of the user interface.

5. The method of claim 1 wherein at least one of the at least one behavior action modifies at least one of the at least one user interface element.

6. The method of claim 1 wherein one of the at least one behavior action executes a user-specified command or file using a user-specified command line parameters.

7. The method of claim 6 further comprising:
executing, in response to the initial state being displayed and at least one of the at least one event being detected, in the user interface at least one of the at least one behavior action.

8. The method of claim 1 further comprising:
reading the recorded initial state of the user interface and the recorded at least one property of the initial state of the user interface from the persistent datastore;

interpreting the recorded initial state of the user interface and the recorded at least one property of the initial state of the user interface.

9. The method of claim 1 further comprising:
communicating the initial state of the user interface and the interaction rule to a programmer tool, wherein the programmer tool is configured to generate executable code of a software application based on the initial state of the user interface and the interaction rule, and wherein the generated executable code implements at least a portion of the user interface.

10. A physical computer-readable medium having computer-executable instructions that, when executed by a computing device, cause the computing device to perform the method recited in claim 1.

11. A method of attributing behavior to at least one user interface element of a user interface, wherein the at least one user interface element is defined in a layered graphical representation specifying a plurality of graphical layers, the method comprising:
designating, based on a selection by a user of at least one of the plurality of graphical layers, at least one of the plurality of the graphical layers as an initial state of the user interface, wherein at least one of the plurality of the graphical layers defines the at least one user interface element;
setting, based on user input, at least one property of the initial state of the user interface that specifies at least one event and at least one behavior action of an interaction rule associated with the initial state wherein, in response to the initial state being displayed and at least one of the at least one event being detected, at least one of the at least one behavior action is executed in accordance with the interaction rule associated with the initial state, and wherein the at least one behavior action is configured to display a second state instead of the initial state wherein another at least one of the plurality of graphical layers is designated as the second state;
displaying the initial state of the user interface;
detecting at least one of the at least one event; and
executing, in response to the detecting, at least one of the at least one behavior action; and
wherein the method is performed by a computer.

12. The method of claim 11 wherein at least one of the at least one event indicates user input via the user interface.

13. The method of claim 11 wherein at least one of the at least one behavior action modifies the initial state of the user interface.

14. The method of claim 11 wherein one of the at least one behavior action executes a user-specified command or file using a user-specified command line parameters.

15. The method of claim 11 further comprising:
executing, in response to the initial state being displayed and at least one of the at least one event being detected, in the user interface at least one of the at least one behavior action.

16. The method of claim 11 further comprising:
reading the initial state of the user interface and the at least one property of the initial state of the user interface from a persistent datastore;
interpreting the initial state of the user interface and the at least one property of the initial state of the user interface.

17. The method of claim 11 further comprising:
communicating the initial state of the user interface and the interaction rule to a programmer tool, wherein the programmer tool is configured to generate for use in generating executable code of a software application based on the initial state of the user interface and the interaction rule, and wherein the generated executable code implements at least a portion of the user interface.

18. A physical computer-readable medium having computer-executable instructions that, when executed by a computing device, cause the computing device to perform the method recited in claim 11.

19. A prototyping system for attributing behavior to at least one user interface element of a user interface, wherein the at least one user interface element is defined in a layered graphical representation specifying a plurality of graphical layers, the prototyping system comprising:
a storage medium configured to provide a persistent datastore;
a prototyping tool configured to designate, based on a selection by a user of at least one of the plurality of graphical layers, at least one of the plurality of the graphical layers as an initial state of the user interface, wherein the at least one of the plurality of graphical layers defines the at least one user interface element, and further configured to set, based on user input, at least one property of the initial state of the user interface that specifies at least one event and at least one behavior action of an interaction rule associated with the initial state wherein, in response to the initial state being displayed and at least one of the at least one event being detected, at least one of the at least one behavior action is executed in accordance with the interaction rule associated with the initial state, and wherein the at least one behavior action is configured to display a second state instead of the initial state wherein another at least one of the plurality of graphical layers is designated as the second state; and
a processing unit configured to record the initial state of the user interface and the at least one property of the initial state of the user interface in the persistent datastore.

* * * * *